Patented June 25, 1946

2,402,613

UNITED STATES PATENT OFFICE 2,402,613

METHOD OF PRODUCING THIOLS

Mark W. Farlow and Frank K. Signaigo, Wilmington, Del., assignors to E. I. du Pont de Nemours & Company, Wilmington, Del., a corporation of Delaware No Drawing. Application August 11, 1939
Serial No. 289,580

21 Claims. (Cl. 260—609)

1

This invention relates to catalytic hydrogenation processes and more particularly to the production of thiols by hydrogenation.

Thiols have been prepared by the catalytic hydrogenation of carboxylic acids, their salts and esters and derivatives hydrolyzable to carboxylic acids in the presence of hydrogen sulfide or materials that yield hydrogen sulfide under the reaction conditions. Such process, however, has the disadvantages in that the reaction is limited to the production of primary thiols, the yields are indifferent, and when acids are used as raw materials serious corrosion problems are encountered.

Thiols have also been prepared by passing a mixture of an alcohol vapor and hydrogen sulfide at elevated temperatures over catalysts such as thoria. This process, however, does not lend itself readily to commercial use in view of the indifferent results obtained. Moreover, the process is not adapted for the production of secondary thiols.

This invention has as its object the preparation of thiols by a new and improved method. Another object is the preparation of primary and secondary thiols by simple and direct processes. Still another object is the preparation of thiols from readily available raw materials. A further object is the production of new thiols. Other objects will be apparent from a reading of the following description of the invention.

These objects are accomplished by the following invention which comprises catalytically hydrogenating compounds containing the thiocarbonyl group $$-\underset{|}{C}=S$$

or its sulfhydrate or substances which under the reaction conditions give rise to compounds having such groups.

As an illustrative example, an organic carbonyl compound is charged into a high pressure autoclave together with hydrogen, an excess of hydrogen sulfide, and a sulfactive hydrogenation catalyst. The sealed autoclave is agitated and heated to a temperature at which reaction occurs at a suitable rate. Additional hydrogen is added to the autoclave as needed to maintain the partial pressure of hydrogen in the autoclave in the neighborhood of 1000 lbs. per sq. in. After the reaction is completed as evidenced by no further absorption of hydrogen, the autoclave is cooled, the catalyst separated from the product and the product subjected to distillation.

Since the exact manner of practicing this invention will vary somewhat depending upon the particular compound processed, the invention is best described by means of the following specific examples.

Example I

A sulfactive catalyst is prepared as follows: A solution of 240 grams of sodium sulfide nonahydrate ($Na_2S.9H_2O$) and 64 grams of sulfur in 900 cc. of water is added rapidly with stirring to a solution of 238 grams of cobalt chloride hexahydrate ($CoCl_2.6H_2O$) in 500 cc. of water. The black precipitate is filtered with suction and washed free from soluble salts with water. The catalyst is then washed several times with dioxan and stored and used as a paste.

Fifteen grams (dry basis) of the above catalyst in paste form is charged into a small shaking autoclave together with 114 grams of octanone-2 and 34 grams of liquid hydrogen sulfide. The autoclave is then sealed and hydrogen is forced into the autoclave from high pressure storage tanks until the total pressure is 1500 lbs./sq. in. The autoclave and contents are then heated to a temperature of 150° C. at which temperature reaction is rapid, as evidenced by the fall in pressure. Additional hydrogen is added from time to time to maintain the total pressure in the range from 1000 to 2000 lbs./sq. in. until the reaction is complete as evidenced by no further decrease in pressure. The cooled autoclave is opened and the contents rinsed out with ether. The ether solution is then filtered to separate the catalyst and boiled to drive out any excess hydrogen sulfide. Titration of an aliquot of the solution with standard iodine solution indicates the conversion to octanethiol-2 to be 75% of the theoretical amount. On distillation there is obtained, after removal of the solvent, a foreshot of unchanged octanone-2 together with a fraction of pure octanethiol-2, B. P. 85° C. at 23 mm.; refractive index $N_D^{25}=1.4455$ and density, $d_4^{25}=0.8314$.

The above experiment is repeated under the same conditions except that 90 grams of hexanone-2 is substituted for the above charge of octanone-2. On working up the reaction mixture, hexanethiol-2 is obtained in 66% yield.

Example II

Ninety-eight grams of cyclohexanone and 32 grams of sulfur are charged into a small shaking autoclave, together with 15 grams of the cobalt polysulfide catalyst described in the foregoing example. Hydrogen is forced into the autoclave to a total pressure of 1500 lbs./sq. in. and the contents heated to a temperature of 150° C. The reaction occurs very rapidly as evidenced by the rapid fall in pressure, and it is necessary to add hydrogen to the autoclave from time to time in order to maintain the pressure in the range from 1000 to 2000 lbs./sq. in. After the reaction is complete as evidenced by no further pressure drop, the contents of the bomb are cooled, rinsed out with ether, and filtered to remove the catalyst. The ether solution is boiled to drive out any excess hydrogen sulfide and titration of an aliquot of the solution with standard iodine indicates a conversion to cyclohexanethiol of 85% of the theoretical. On fractional distillation at 100 mm. pressure, there is obtained a foreshot of solvent and cyclohexanone and a main fraction of pure cyclohexanethiol boiling at 90° C./100 mm., having a refractive index $N_D^{20}=1.4933$ and density $d_4^{20}=0.9486$.

Nickel and also iron sulfide catalysts prepared similarly to the cobalt sulfide catalyst may be substituted under similar conditions for the latter catalyst. On working up the reaction product, cyclohexanethiol is obtained in 88% yield when the iron catalyst is used and 74% yield when the nickel catalyst is used.

*Example III*

One hundred ten grams of isofenchone, 45 grams of sulfur, 50 grams of acetic acid and 15 grams of cobalt polysulfide catalyst prepared as described under Example I are charged into a small shaking autoclave together with hydrogen to a pressure of 2000 lbs./sq. in. The autoclave is heated at 150° C. until the reaction is complete as evidenced by no further hydrogen absorption. The cooled contents of the autoclave are filtered from the catalyst and warmed to drive off any excess hydrogen sulfide. Titration of an aliquot of the solution with standard iodine indicates the conversion to isofenchanethiol to be 80%. After washing the product with water to remove the acetic acid the product is distilled at 30 mm. pressure and there is obtained the isofenchanethiol fraction, a colorless oil boiling at 90° to 105° C. and containing 17% of mercaptan sulfur.

*Example IV*

One hundred seven grams of acetophenone, 45 grams of sulfur, and 50 grams of acetic acid are charged into a small shaking autoclave, together with 15 grams of cobalt polysulfide catalyst prepared as in Example I. Hydrogen is forced in to a pressure of 1500 lbs./sq. in. and the autoclave is heated to 150° C. After 6 hours the absorption of hydrogen has ceased, the autoclave and contents are cooled, and the liquid product filtered to remove the catalyst. The reaction mixture upon analysis was found to contain 1-phenylethanethiol.

*Example V*

A sulfactive catalyst is prepared exactly as described under Example I except that the precipitated cobalt polysulfide after being washed with water is then washed several times with glacial acetic acid and stored and used as an acetic acid paste containing 25% of dry catalyst.

Sixty grams of the above described catalyst paste is charged into a small shaking autoclave together with 75 grams of benzaldehyde and 45 grams of sulfur. The autoclave is sealed and hydrogen is forced in to a pressure of 1500 lbs./sq. in. and the autoclave heated to 150° C. After one and one-half hours the reaction has terminated as evidenced by no further pressure decrease. After removing the catalyst and washing the oil with water to remove the acetic acid, the product is distilled at reduced pressure. There is obtained 92 grams of pure phenylmethanethiol boiling constantly at 99° C. at 32 mm. pressure, a colorless liquid having a refractive index of $N_D^{25}=1.5729$ and density of $d_4^{25}=0.8097$.

There is also obtained 35 grams of higher boiling oil.

*Example VI*

One hundred grams of 2-ethylhexanal, 60 grams of sulfur, and 60 grams of the sulfactive catalyst paste described under Example V are charged into a small shaking autoclave together with hydrogen at 1800 to 2000 lbs./sq. in. pressure. The autoclave is heated to 150° C. and after 4.5 hours the absorption of hydrogen has become very slow and the temperature is raised and maintained at 175° C. for two hours more. The catalyst is removed by filtration and the acetic acid is removed by washing with water. On distillation there is obtained 88 grams of pure 2-ethylhexanethiol-1 boiling at 80° C. at 19 mm. pressure. The colorless liquid contains 21.5% of mercaptan sulfur and has a refractive index of $N_D^{25}=1.4541$, and density of $d_4^{25}=0.8467$.

*Example VII*

One hundred grams of levulinic acid, 60 grams of sulfur, and 15 grams of cobalt sulfide catalyst prepared as described under Example I are reacted with hydrogen at 1000 to 2000 lbs./sq. in. pressure and a temperature of 150° to 175° C. in a small autoclave. After six hours the absorption of hydrogen has ceased. The products of the reaction are then subjected to fractional distillation after removal of the catalyst by filtration. There is obtained 67 grams of a fraction boiling at 94° to 95° C. at 22 mm., and 18 grams of a fraction boiling at 140° C. at 22 mm. The lower-boiling fraction contains 25.5% of total sulfur and 2.5% of mercaptan sulfur, has a density of $d_4^{25}=1.0818$ and refractive index of $N_D^{25}=1.4936$. This material consists principally of the lactone of 4-mercaptovaleric acid formed by cyclization of the 4-mercaptovaleric acid. The higher boiling fraction contains 22.3% of total sulfur and 14% of mercaptan sulfur. This material is a mixture of the unstable 4-thiolvaleric acid and the thiolactone into which it readily cyclicizes.

When the above experiment is repeated under identical conditions except that 125 grams of 4-ketopimelic acid and 45 grams of sulfur are substituted for the charge of levulinic acid and sulfur described above, there is obtained 4-thiolpimelic acid and the lactone of 4-mercaptopimelic acid. If the above experiment is repeated except that 6-ketohendecane-1,11-dioic acid is substituted for the levulinic acid, there is obtained 6-mercaptohendecane-1,11-dioic acid in 82% yield.

*Example VIII*

Ninety-eight grams of mesityl oxide, 60 grams of sulfur and 50 grams of acetic acid are charged into a small autoclave together with 15 grams of cobalt polysulfide catalyst prepared as in Example I. Hydrogen is forced into the autoclave to a pressure of 1500 lbs./sq. in. and the autoclave is heated to a temperature of 150° to 175° C. for 7 hours with frequent addition of hydrogen as needed. The contents of the autoclave are filtered to remove the catalyst and distilled. There is obtained 17 grams of a fraction, principally 2-methylpentene-2-thiol-4, boiling at 98° to 110° C. at 100 mm. pressure and containing 19.5% of mercaptan sulfur and 32 grams of a fraction boiling at 118° to 120° C. at 100 mm. that contains 39.3% of mercaptan sulfur. The latter fraction has a refractive index of $N_D^{25} = 1.4978$ and consists principally of 2-methylpentanedithiol-2,4.

The above experiment is repeated under identical conditions except that 100 grams of 2-ethylhexene-2-al is substituted for the mesityl oxide above. On distilling the reaction product, there is obtained 30 grams of a fraction, principally 2-ethylhexene-2-thiol-1, boiling at 85° to 94° C. at 32 mm., and containing 16.4% of mercaptan sulfur. There is also obtained 30 grams of a fraction, principally 2-ethylhexanedithiol-1,3 boiling at 131° to 132° at 32 mm. and containing 32.8% of mercaptan sulfur, $N_D^{25} = 1.5047$.

*Example IX*

A sulfided cobalt catalyst is prepared as follows: Finely divided, pyrophoric cobalt (prepared by the sodium-naphthalene reduction of anhydrous cobalt chloride) is suspended in methanol and hydrogen sulfide is bubbled through the suspension until the evolution of hydrogen has ceased. Forty grams of the sulfided cobalt so obtained is suspended in 300 cc. of water and the suspension is boiled for one-half hour after which a solution of 30 grams of sulfuric acid in 50 cc. of water is slowly added. The mixture is then boiled for an additional two hours after which it is cooled, washed with water by decantation, and finally on filter paper until the filtrate becomes essentially neutral. A methanol paste of the solid catalyst is then prepared which contains approximately 60% of methanol.

One hundred grams of pentadecanone-8 is charged into a steel shaker-tube along with 35 grams of hydrogen sulfide and 15 grams of the cobalt sulfide catalyst prepared as above and the mixture is hydrogenated at 120° C., and at a total pressure of 2000 to 3000 lbs./sq. in. Hydrogen absorption is complete after about four hours. The product is a colorless oil practically all of which boils at 158° to 160° C./10 mm. The distillate weighs 104 grams, and an iodine titration shows it to be pure pentadecanethiol-8 having a melting point of −10.5° C. and refractive index of $N_D^{25} = 1.4580$.

A similar run, in which heptadecanone-9 is used in place of pentadecanone-8, gives heptadecanethiol-9, B. P. 196° to 197° C./18 mm. Again the yield is practically quantitative.

*Example X*

A sulfided molybdenum catalyst is prepared as follows: To 36.5 grams of a powdered molybdenum-aluminum alloy (containing approximately equal weights of the two metals) in 300 cc. of boiling water is added slowly a solution of 130 grams of sulfuric acid in 100 cc. of water. The suspension is then boiled, with stirring, for four hours. The product is washed with water until essentially free from acid, then suspended in methanol. Hydrogen sulfide is passed through the suspension to saturation and the solution is allowed to stand for two weeks. The product is washed with methanol and made into a methanol paste.

A mixture of 100 grams of pentadecanone-8 and 33 grams of flowers of sulfur is hydrogenated in the presence of 15 grams of the sulfided molybdenum catalyst at 120° C. and a pressure of 2000 to 3000 lbs./sq. in. When the hydrogen absorption is complete at 120° C., the temperature is raised slowly to 225° C. and a further absorption occurs. The product, which is isolated as in Example IX, weighs 99 grams, and an iodine titration shows that it contains 76% by weight of pentadecanethiol-8.

*Example XI*

A mixture of 100 grams of pentadecanone-8, 33 grams of sulfur, and approximately 60 grams of a cobalt polysulfide-acetic acid paste (prepared as in Example V) is charged into a steel shaker-tube and hydrogenation is allowed to proceed at a pressure of 1000 to 1500 lbs./sq. in., the temperature being raised successively to 150° C. and, after absorption is practically complete at 150° C., to 175° C., and finally to 200° C. The product, worked up as in Example IX, gives pentadecanethiol-8 in a yield of over 95%.

Under similar conditions laurone

and palmitone

are converted into the corresponding thiols in excellent yields.

*Example XII*

A suspension of 100 grams of pentadecanone-8 in 200 cc. of absolute alcohol is treated simultaneously with streams of dry hydrogen sulfide and hydrogen chloride. The freezing point of the mixture becomes lower as the reaction progresses so that it is possible to lower the temperature of the mixture gradually from 25° C. to 0° C. over the course of 7 hours, without the crystallization of large amounts of unchanged ketone. At this point the passage of the gases through the mixture (which has separated into two liquid layers) is continued overnight at room temperature. The entire product is then poured into water. The upper, oily layer is separated with ether. Upon complete evaporation of the ether at a temperature below 80° C. a red oil remains which weighs 120.0 grams and has the following properties:

| | |
|---|---|
| Molecular weight | 272, 276 |
| Percentage sulfur | 20.77, 20.83 |
| Percentage carbon | 66.80 |
| Percentage hydrogen | 11.83 |

These figures indicate that the red oil contains both a thioketone and its sulfhydrate having the following structures, respectively:

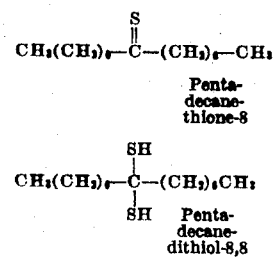

The red oil, upon hydrogenation in the presence of a cobalt sulfide catalyst (prepared as in Example V), at 150° C. and at a hydrogen pressure of 1000 to 2000 lbs./sq. in., gives pentadecanethiol-8 in 79% yield.

*Example XIII*

One hundred grams of cyclohexanone and 38 grams of carbon bisulfide together with 15 grams of the cobalt polysulfide catalyst described in Example I are charged into a small autoclave and hydrogen introduced to a pressure of 1500 lbs./sq.

in. The autoclave is heated to 150° C. and this temperature maintained for 5 hours, additional hydrogen being added as needed. The autoclave is then discharged, the catalyst separated from the reaction product, and the latter fractionally distilled at reduced pressure. The product thus obtained consists of 41 grams of cyclohexanethiol and 12 grams of unconverted cyclohexanone. The remainder of the product is a high-boiling oil.

*Example XIV*

Into a small autoclave there is charged 100 grams of heptadecanone-7, 33 grams of sulfur, and 60 grams of the cobalt polysulfide-acetic acid paste prepared as described in Example V. Hydrogen at 1500 lbs. pressure is added and the autoclave heated to 150° C. for 2 hours. After this time the temperature is raised to 175° for 1 hour and then to 200° C. for 1 hour. After absorption of hydrogen has ceased, the autoclave is discharged, the catalyst separated and the reaction product subjected to distillation. One hundred six grams of pure heptadecanethiol-7 are obtained. This material has a boiling point of 153° C. at 1 mm. pressure and a refractive index of $N_D^{25}=1.4594$ and density of $d_4^{25}=0.8384$.

The foregoing examples indicate specifically certain compounds that may be converted into thiols according to this invention. We do not, however, wish to limit ourselves to these particular materials.

The catalytic hydrogenation of any and all organic compounds containing the thiocarbonyl group

or its sulfhydrate or substances which under the reaction conditions give rise to compounds having such groups fall within the scope of this invention. Specific examples of carbonyl compounds that may be used in the processes described herein are aliphatic ketones such as acetone, methyl ethyl ketone, diethyl ketone, methyl propyl ketone, methyl butyl ketone, di-n-propyl ketone, di-isopropyl ketone, di-n-butyl ketone, di-isobutyl ketone, etc.; alcyclic ketones such as cyclopentanone, methylcyclohexanone, methone, camphor, beta-decalone; aryl ketones, for example, acetophenone, benzophenone, etc.; aliphatic aldehydes as, for example, formaldehyde, acetaldehyde, propionaldehyde, n-butyraldehyde, isobutyraldehyde, heptaldehyde; and aryl aldehydes such as p-toluic aldehyde, benzaldehyde, and the like. The compounds processed may contain more than one carbonyl group. Examples of compounds of this type are glyoxal, diacetyl, acetylacetone, acetonylacetone, cyclohexanedione, quinone, benzoylacetone, 1,4-dibenzoylbutane, poly methyl vinyl ketone. Certain derivatives of carbonyl compounds are convertible to thiols by our process and fall within the scope of this invention. Examples of compounds of this type are: hemiacetals such as 1-ethoxy-1-hydroxybutane; hemiketals such as 8-methoxy-8-hydroxypentadecane; acetals such as 1,1-dimethoxyheptane; ketals such as 1,1-diethoxycyclohexanone; hydrated carbonyl compounds such as methylene glycol, 2,2-dihydroxybutane; the condensation products of carbonyl compounds with ammonia or amines such as acetaldehyde ammonia, hexamethylene tetramine, benzilidene aniline, cyclohexylidene imine.

When compounds of the above types are used it is necessary to carry out the hydrogenation in the presence of hydrogen sulfide or substances capable of yielding hydrogen sulfide under the conditions of the reaction.

The reaction may take place in two stages. In the first stage the carbonyl compounds may react with the hydrogen sulfide to form the corresponding thioketone (or thioaldehyde) or a compound containing the group

In the second stage, these latter substances may then react with hydrogen in the presence of the sulfactive catalysts to form the thiol. While both stages are conveniently carried out together as described in most of the foregoing examples, it is also considered to be a part of this invention to react carbonyl compounds with hydrogen sulfide in any convenient manner and to subject the reaction products to hydrogenation over a sulfactive catalyst under the conditions already set forth so as to obtain the corresponding thiols (see Example XII).

Specific examples of thiocarbonyl compounds that may be hydrogenated to thiols by our process are those corresponding to the above mentioned carbonyl compounds and the corresponding sulfhydrates.

Our process may also be applied to compounds that contain other functional groups in addition to those that give rise to the thiol group. For example, compounds of the class previously described may contain also any of the following functional groups or linkages: hydroxyl as in hydroxy-aldehydes and ketones as glycol aldehyde, aldol, sugars; amino as in aminoketones such as triacetone-amine, aminoacetophenone; nitro as in nitroaldehydes and ketones such as nitrobenzaldehyde; halogen as in chloroaldehydes and ketones such as chloroacetone; carboxyl and its salts, esters, amides as ketoacids, ketoesters such as pyruvic acid, ketostearic acid, acetoacetic ester; compounds containing the ethylene bond such as unsaturated aldehydes and ketones as crotonaldehyde, citronal, phorone; compounds containing the acetylenic bond such as acetylenic ketones, compounds containing the ether linkage as alkoxy and aryloxy aldehydes and ketones as, for example, methoxy benzaldehyde, ethoxy acetophenone; compounds containing heterocyclic nuclei as, for example, furfural, C-acetylpyrrole, gamma-pyridone, and the like. The compounds may contain still other groups such as the sulfo-acid group, the thioether group, etc. In general such compounds yield thiols containing also other functional groups. Examples of such compounds are: hydroxythiols, aminothiols, halogenothiols, mercapto acids, unsaturated thiols, thio ethers, etc. In the case of unsaturated carbonyl compounds, however, and particularly those in which the carbon-to-carbon double bond is in the $\alpha$-$\beta$ position to the carbonyl group, there may be formed a dithiol compound in addition to or instead of a monothiol (see Example VIII). In the case of aldehydo- or ketoacids having the carbonyl group in the 4 or 5 position with respect to the carboxyl group, a lactone of mercapto acid may be formed in addition to or instead of the mercapto acid (see Example VII). The production of these compounds in this manner is considered to fall within the scope of this invention.

Although in the above examples we have indicated certain definite conditions of temperature, pressure, concentration, duration of reaction, catalyst, etc., it is to be understood that these values may be varied somewhat within the scope of this invention since the conditions of each experiment are determined by the particular carbonyl compound treated, the quantity employed and the catalyst used. In general the processes of this invention are operable at temperatures ranging from 75° to 300° C. and at pressures ranging from atmospheric to a maximum determined by the practical limitations of the reaction vessel. We prefer to operate at a temperature of 100° to 250° C. and under a total pressure of 1000 to 5000 lbs. per sq. in.

Instead of charging hydrogen sulfide into the reaction vessel as such, we may use substances that yield hydrogen sulfide under the reaction conditions. For example, we have found that sulfur is rapidly converted by hydrogen into hydrogen sulfide in the presence of sulfactive catalysts such as are described herein at temperatures as low as 75° C. and can therefore be charged into the autoclave with the carbonyl compound instead of hydrogen sulfide (see Examples II, XI, etc.). Similarly carbon bisulfide or sulfur dioxide may be substituted for hydrogen sulfide. The proportion of hydrogen sulfide or substances yielding hydrogen sulfide used may be varied considerably but it is desirable that an excess over the amount theoretically required be used. In general at least one mol of hydrogen sulfide or an equivalent amount of a substance convertible into hydrogen sulfide, will be used for each equivalent of carbonyl compound.

The proportion of catalyst employed may be varied considerably. In general an amount of catalyst is used that will bring about reaction at a suitable rate. The type of sulfactive catalyst employed may likewise be varied considerably. In general the common hydrogenating metals as well as the sub-sulfides, sulfides or polysulfides of such metals are effective. Especially useful are the sulfides or polysulfides of the metals copper, silver, lead, molybdenum, manganese, iron, cobalt, and nickel. The finely divided metal or metal sulfides may be used as such, or they may be supported on suitable inert carriers such as kieselguhr, magnesia, alumina, etc. It will be noted that the above catalysts are active in promoting a reaction in which one of the reactants is sulfur or a sulfur compound, said catalysts being especially adapted for the removal of sulfur unsaturation in organic compounds. Such catalysts are referred to herein as sulfactive hydrogenation catalysts.

Typical methods of preparation of several sulfactive catalysts are described in the foregoing examples. In general metal sulfides may be formed by precipitation methods or by sulphidation of the metals or their compounds at ordinary or elevated temperatures by means of sulfur, hydrogen sulfide or other sulfur compounds. The activity of certain of the metal sulfide catalysts may be improved by treatment with hydrogen at elevated temperatures perhaps due to the reduction of a higher sulfide to a lower one. The partial or complete sulphidation or reduction treatment of the catalyst may take place during the preliminary stages of its use in the processes of this invention.

The process may be carried out in the absence of solvents or in the presence of water or organic solvents as, for example, ethanol, dioxan, or benzene. Furthermore, it is frequently desirable to carry out the reaction in the presence of certain active solvents such as organic acids or mineral acids since in many cases improved yields of thiols are thus obtained. As an example of an active solvent, acetic acid is especially useful. On the other hand, the addition of alkalies, ammonia or amines is sometimes beneficial.

The process may be carried out as a continuous liquid or vapor phase operation.

This invention is used for the preparation of primary and secondary thiols and compounds which contain the thiol group in addition to other functional groups. The thiols so produced are valuable products having many industrial uses either as such or as intermediates in the manufacture of other important products. For example, the thiols are converted by mild oxidation into disulfides or either the thiols or the disulfides may be converted by energetic oxidation into the corresponding sulfonic acids which have valuable surface-active properties.

This invention offers many advantages over prior methods for making thiols from the standpoint of economy and efficiency. It comprises a novel and effective catalytic hydrogenation process by which carbonyl compounds are converted in a single operation and in high yields into thiols with a minimum of undesirable side reactions. By this means a wide variety of thiols can be obtained by economical methods where heretofore a complicated series of reactions were necessary.

Since many different modifications of this invention can be made without departing from the spirit and scope thereof, it is to be understood that we do not wish to limit ourselves except as defined in the appended claims.

We claim:

1. The process which comprises catalytically hydrogenating a compound selected from the group consisting of compounds containing a thiocarbonyl group

and the sulfhydrates of said compounds.

2. The process which comprises reacting an organic carbonyl compound with hydrogen and a substance selected from the group consisting of elementary sulfur and hydrogen sulfide, in the presence of a sulfactive hydrogenation catalyst.

3. The process which comprises reacting a carbonyl compounds with hydrogen sulfide to form a sulfur-containing condensation product, and thereafter reacting said sulfur containing condensation product with hydrogen in the presence of a sulfactive hydrogenation catalyst.

4. The process which comprises reacting a thiocarbonyl compound with hydrogen in the presence of a sulfactive hydrogenation catalyst.

5. The process which comprises reacting a sulfhydrate of a thiocarbonyl compound with hydrogen in the presence of a sulfactive hydrogenation catalyst.

6. The process for the preparation of secondary thiols which comprises reacting a ketone with hydrogen and a substance selected from the group consisting of elementary sulfur and hydrogen sulfide in the presence of a sulfactive hydrogenation catalyst.

7. The process in accordance with claim 2 characterized in that the organic carbonyl compound is an alicyclic ketone.

8. The process in accordance with claim 2 characterized in that the organic carbonyl compound is an aliphatic ketone.

9. The process which comprises reacting at a temperature between 75° C. and 300° C. a compound selected from the group consisting of compounds containing a thiocarbonyl group

the sulfhydrates of said compounds, and substances which under the conditions of reaction give rise to compounds having such groups, with hydrogen, and a substance selected from the group consisting of elementary sulfur, hydrogen sulfides, and compounds capable of yielding hydrogen sulfide under the conditions of reaction in the presence of a sulfactive hydrogenation catalyst.

10. The process in accordance with claim 9 characterized in that the catalyst is a sulfide of a metal of the iron group of the Periodic Table.

11. The process in accordance with claim 9 characterized in that the catalyst is cobalt sulfide.

12. The process in accordance with claim 9 characterized in that the catalyst is nickel sulfide.

13. The process in accordance with claim 9 characterized in that the catalyst is molybdenum sulfide.

14. The process which comprises reacting an organic carbonyl compound with hydrogen and sulfur in the presence of a sulfactive hydrogenation catalyst.

15. The process which comprises reacting an organic carbonyl compound with hydrogen and hydrogen sulfide in the presence of a sulfactive hydrogenation catalyst.

16. The process in accordance with claim 2 characterized in that the compound treated is heptadecanone-7.

17. The process in accordance with claim 2 characterized in that the organic carbonyl compound is a long-chain aliphatic ketone.

18. The process in accordance with claim 2 characterized in that the organic carbonyl compound is a long-chain aliphatic ketone having 15 to 17 carbon atoms and having the ketone group located in the seventh to eighth position.

19. The process in accordance with claim 2 characterized in that the organic carbonyl compound is an unsaturated ketone.

20. The process in accordance with claim 2 characterized in that the organic carbonyl compound is mesityl oxide.

21. The process in accordance with claim 2 characterized in that the organic carbonyl compound is cyclohexanone.

MARK W. FARLOW.
FRANK K. SIGNAIGO.